: US 8,721,194 B2
(45) Date of Patent: May 13, 2014

(12) United States Patent
Huang et al.

(54) OPTICAL TRANSCEIVER MODULE

(75) Inventors: Yun-Cheng Huang, Zhongli (TW);
Chi-Min Ting, Zhongli (TW);
Tsing-Chow Wang, Kaohsiung (TW);
Chung Hsin Fu, Longtan Township,
Taoyuan County (TW)

(73) Assignee: LuxNet Corporation, Jongli, Tao-Yuan County (TW)

( * ) Notice: Subject to any disclaimer, the term of this patent is extended or adjusted under 35 U.S.C. 154(b) by 71 days.

(21) Appl. No.: 13/613,598

(22) Filed: Sep. 13, 2012

(65) Prior Publication Data

US 2013/0287406 A1    Oct. 31, 2013

(30) Foreign Application Priority Data

Apr. 26, 2012    (TW) .............................. 101114926 A

(51) Int. Cl.
*G02B 6/36* (2006.01)
*G02B 6/26* (2006.01)
*G02B 6/42* (2006.01)
*G02B 6/43* (2006.01)

(52) U.S. Cl.
CPC .............. *G02B 6/4214* (2013.01); *G02B 6/264* (2013.01); *G02B 6/4201* (2013.01); *G02B 6/4204* (2013.01); *G02B 6/4249* (2013.01); *G02B 6/425* (2013.01); *G02B 6/4256* (2013.01); *G02B 6/426* (2013.01); *G02B 6/43* (2013.01)
USPC .................. 385/93; 385/15; 385/31; 385/33; 385/39; 385/47; 385/49; 385/88; 385/89; 385/92

(58) Field of Classification Search
CPC ............ G02B 6/264; G02B 6/30; G02B 6/32; G02B 6/42; G02B 6/4201; G02B 6/4204; G02B 6/4214; G02B 6/4249; G02B 6/425; G02B 6/4256; G02B 6/426; G02B 6/43
USPC ........... 385/15, 31, 33, 39, 47, 49, 88, 89, 92, 385/93
See application file for complete search history.

(56) References Cited

U.S. PATENT DOCUMENTS

| 6,947,671 | B2* | 9/2005 | Sekiya et al. | 398/86 |
| 7,063,467 | B2* | 6/2006 | Nagasaka et al. | 385/88 |
| 7,539,367 | B2* | 5/2009 | Tamura et al. | 385/14 |
| 8,079,125 | B2* | 12/2011 | Ban et al. | 29/407.09 |
| 8,469,610 | B2* | 6/2013 | Shao et al. | 385/93 |
| 8,483,571 | B2* | 7/2013 | McColloch et al. | 398/141 |
| 2006/0110110 | A1* | 5/2006 | Yi et al. | 385/93 |
| 2010/0135618 | A1* | 6/2010 | Howard et al. | 385/79 |

* cited by examiner

*Primary Examiner* — Ryan Lepisto
(74) *Attorney, Agent, or Firm* — Muncy, Geissler, Olds & Lowe, P.C.

(57) ABSTRACT

The present invention provides an optical transceiver module, comprising: a circuit substrate; a z-axis positioning base connected to the circuit substrate that, wherein the z-axis positioning base comprises two first sides respectively provided on two lateral sides of the optical transceiver sub-module, a second side provided between and connecting the two first sides, an opening corresponding in position to a side of the optical transceiver sub-module that faces away from the second side, and a step difference provided on each of the two first sides and the second side; a fiber-optic lens element provided on the z-axis positioning base and comprises a cover and a fiber-optic lens sub-module, wherein the cover comprises a recess and step differences surrounding the recess and respectively corresponding in position to the step differences provided on the z-axis positioning base, so as for the cover to be fitted on the z-axis positioning base.

8 Claims, 5 Drawing Sheets

OPTICAL TRANSCEIVER MODULE

BACKGROUND OF THE INVENTION

1. Technical Field

The present invention relates to an optical transceiver module and, more particularly, to an optical transceiver module which integrates a fiber-optic lens element and an optical transceiver sub-module and has a z-axis positioning base for increasing the lateral fixing force between the optical transceiver sub-module and a substrate.

2. Description of Related Art

Fiber-optic communication is a technique whereby signals are transmitted in the form of light waves from a signal transmitting port to a signal receiving port after conversion from and before conversion back to electrical signals. To convert an electrical signal into an optical signal or vice versa, an optical transceiver module is provided at each end of a fiber-optic. Each optical transceiver module includes an optical transmitter sub-module for converting an electrical signal into an optical signal and transmitting the optical signal and an optical receiver sub-module for receiving the optical signal and converting it into an electrical signal. A typical optical transmission element for use in fiber-optic communication is the laser diode, which is a coherent light source with relatively high directivity and whose coupling efficiency with a single-mode optical fiber can be as high as 50%. The relatively narrow laser output spectrum also helps increasing transfer rate and reducing modal dispersion. The optical receiving element, on the other hand, is usually a photodiode, such as a p-n junction diode, a p-i-n diode or an avalanche photodiode, which converts a received optical signal into an electrical signal through the photoelectric effect.

Conventionally, the optical transmitter sub-module and the optical receiver sub-module are provided on a printed circuit board and are connected to the printed circuit board via a light turning device which is configured for optically coupling an optical signal to an optical fiber. During assembly, the light turning device must be aligned with the optical transmitter sub-module and the optical receiver sub-module respectively, and the alignment process requires an optical calibration instrument for respectively and precisely aligning the plural lenses on the light turning device with the optical transmission element and the optical receiving element. However, as the optical calibration instrument required is very expensive, and assembly plants generally do not have the necessary technique for calibrating the light turning device, difficulties in mass production and progressive assembly tend to arise. Moreover, due to the fact that the copper foils on a rigid printed circuit board cannot be densely arranged, the finished product is bulky and occupies a lot of space. If, in order to increase copper foil density, a flexible printed circuit board is used instead as the circuit substrate, the properties of the flexible printed circuit board will result in an insufficient fixing force between the circuit board and the optical receiving element provided thereon such that, after repeated insertion and removal of an optical fiber connecter, the optical receiving element is very likely to get loose or even come off the flexible printed circuit board as a result of the lateral forces generated by the insertion and removal operations. Should that happen, the optical transceiver sub-module on the flexible printed circuit board will be shifted in position, making the optical transmission element and the optical receiving element out of focus of the lenses and thus lowering the yield rate.

BRIEF SUMMARY OF THE INVENTION

The primary object of the present invention is to combine a light turning device and an optical transceiver sub-module into a single modular unit and to design an optical transceiver module whose structure has an increased fixing force between the optical transceiver sub-module and a substrate. Thus, the substrate, which can be a flexible one, is prevented from deformation by lateral forces resulting from insertion and removal of a connector, and the optical transceiver sub-module is thereby prevented from getting loose, shifting in place or even coming off the substrate.

One aspect of the invention is to provide an optical transceiver module, comprising: a circuit substrate carrying thereon an optical transceiver sub-module for converting electrical signals to and from optical signals; a z-axis positioning base connected to a surface of the circuit substrate that carries the optical transceiver sub-module, wherein the z-axis positioning base comprises two first sides respectively provided on two lateral sides of the optical transceiver sub-module, a second side provided between and connecting the two first sides, an opening corresponding in position to a side of the optical transceiver sub-module that faces away from the second side, and a step difference provided on each of the two first sides and the second side; and a fiber-optic lens element provided on the z-axis positioning base, the fiber-optic lens element comprising a cover and a fiber-optic lens sub-module, wherein the fiber-optic lens sub-module is embedded in a lower surface of the cover; wherein the fiber-optic lens sub-module has a lower surface provided with a plurality of condensing lenses corresponding in position to the optical transceiver sub-module and has a surface which is perpendicular to the lower surface provided with the condensing lenses and which has an optical fiber connection port provided with a plurality of condensing lenses, and the fiber-optic lens sub-module is provided therein with a reflective element for, within the fiber-optic lens sub-module, reflecting light-wave signals of the optical fiber connection port into the optical transceiver sub-module or reflecting light-wave signals of the optical transceiver sub-module into the optical fiber connection port, the optical fiber connection port being exposed through the opening of the z-axis positioning base; and wherein the cover comprises a recess in which the fiber-optic lens sub-module is embedded and step differences surrounding the recess and respectively corresponding in position to the step differences provided on the two first sides and the second side of the z-axis positioning base, so as for the cover to be fitted on the z-axis positioning base.

Preferably, the second side of the z-axis positioning base is provided with a groove in which a bonding material is filled.

Preferably, an adjustment space is formed between the step differences of the z-axis positioning base and the step differences of the cover to enable fine-tuning of the fiber-optic lens sub-module in an x-axis direction and a y-axis direction.

According to the invention, there is a distance between a lower surface of the fiber-optic lens element and the optical transceiver sub-module.

Preferably, the optical transceiver sub-module comprises an optical transmitter sub-module and/or an optical receiver sub-module.

Preferably, the cover has an upper surface provided with a window, and the fiber-optic lens sub-module has an upper surface provided with another window corresponding in position to the window of the cover to facilitate checking whether the optical transceiver sub-module is aligned during assembly.

Preferably, each said first side of the z-axis positioning base is provided with a through hole through which a fastening post is inserted, and the fastening posts are also inserted through the circuit board such that the z-axis positioning base is securely connected to the circuit substrate.

Preferably, the circuit substrate is a flexible circuit board or a printed circuit board.

Therefore, the z-axis positioning base of the present invention is configured for enabling one-step positioning in the z-axis direction. More specifically, as soon as the fiber-optic lens element is assembled to the z-axis positioning base, the height of the fiber-optic lens element in the z-axis direction is fixed, which brings convenience to assembly. The z-axis positioning base also ensures that the fiber-optic lens element is securely connected, and corresponds in position, to an optical transceiver sub-module on the circuit substrate, thereby achieving modular integration of the fiber-optic lens element and the optical transceiver sub-module. In the optical transceiver module disclosed herein, the z-axis positioning base further serves to increase dimensional stability of the circuit substrate, particularly when the circuit substrate is a flexible circuit board. In addition, by inserting fastening posts through the z-axis positioning base and the circuit substrate, the positioning base is securely connected to the circuit substrate, and the optical transceiver sub-module on the circuit substrate is prevented from being defocused, getting loose or coming off the substrate which may otherwise result from lateral forces generated in the xy plane by repeated insertion and removal of an optical fiber connector.

The optical transceiver module disclosed herein not only integrates the optical transceiver sub-module, condensing lenses and so on into a single unit, but also has completed the optical coupling and alignment procedures. Therefore, installation of the optical transceiver module can be easily done by assembling it to the desired circuit board, and once the optical transceiver module is installed, no more optical coupling or alignment procedure is required. As such, the assembly process to be performed at the application end is rather simple.

Moreover, there are no particular limitations on the number(s) of the optical receiver sub-module and/or the optical transmitter sub-module in the optical transceiver module disclosed herein, although the advantages of the present invention are especially apparent when plural optical receiver sub-modules and/or optical transmitter sub-modules are used. For example, once installed on the circuit substrate, the optical receiver sub-modules and/or the optical transmitter sub-modules can be subjected to a burn-in test, and only if the optical receiver sub-modules and/or the optical transmitter sub-modules pass the test will they be allowed to move on to the subsequent assembly process. If the optical receiver sub-modules and/or the optical transmitter sub-modules fail the burn-in test, they can be immediately replaced to ensure the yield rate of the assembled optical transceiver module.

BRIEF DESCRIPTION OF THE SEVERAL VIEWS OF THE DRAWINGS

The structure as well as a preferred mode of use, further objects and advantages of the present invention will be best understood by referring to the following detailed description of an illustrative embodiment in conjunction with the accompanying drawings, in which.

DETAILED DESCRIPTION OF THE INVENTION

Figure 1:
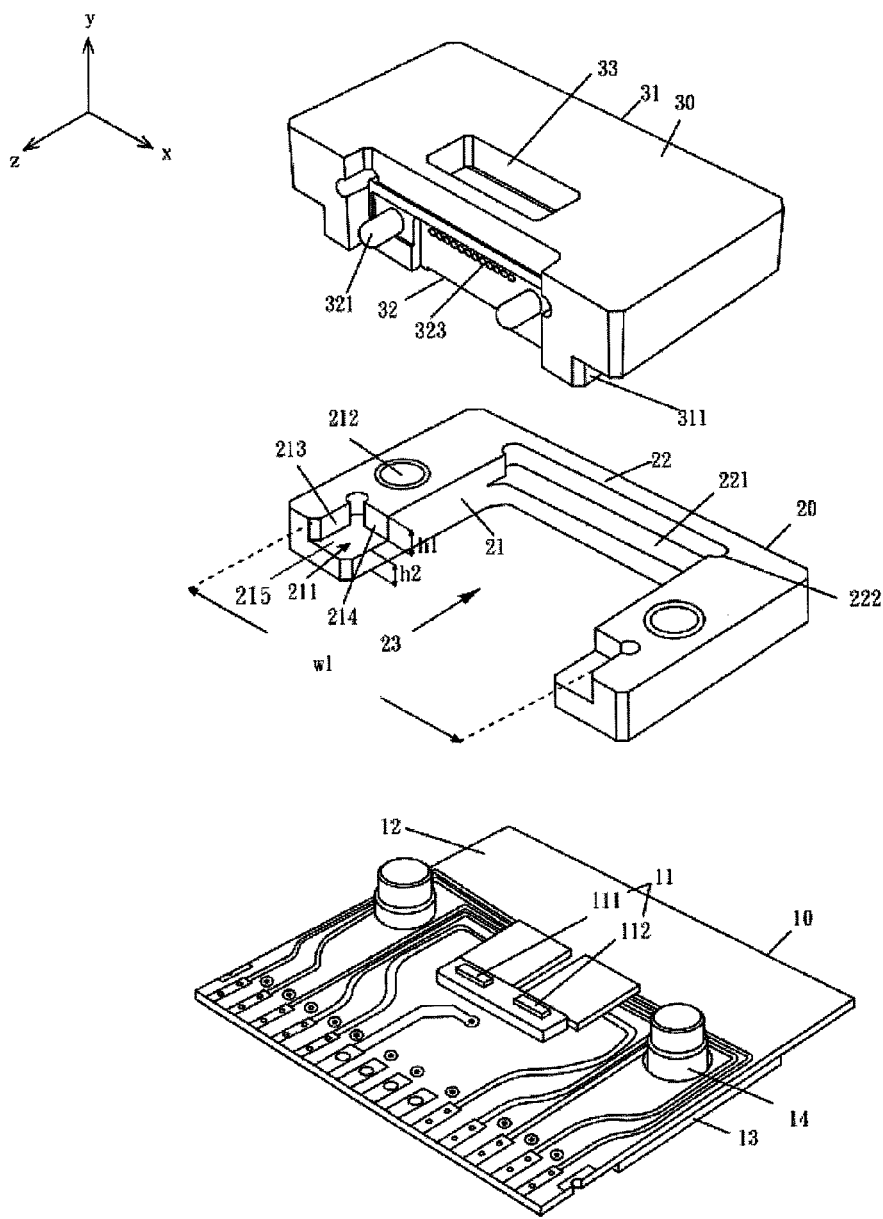
FIG. 1 is an exploded perspective top view of an optical transceiver module according to the present invention.
Figure 2:
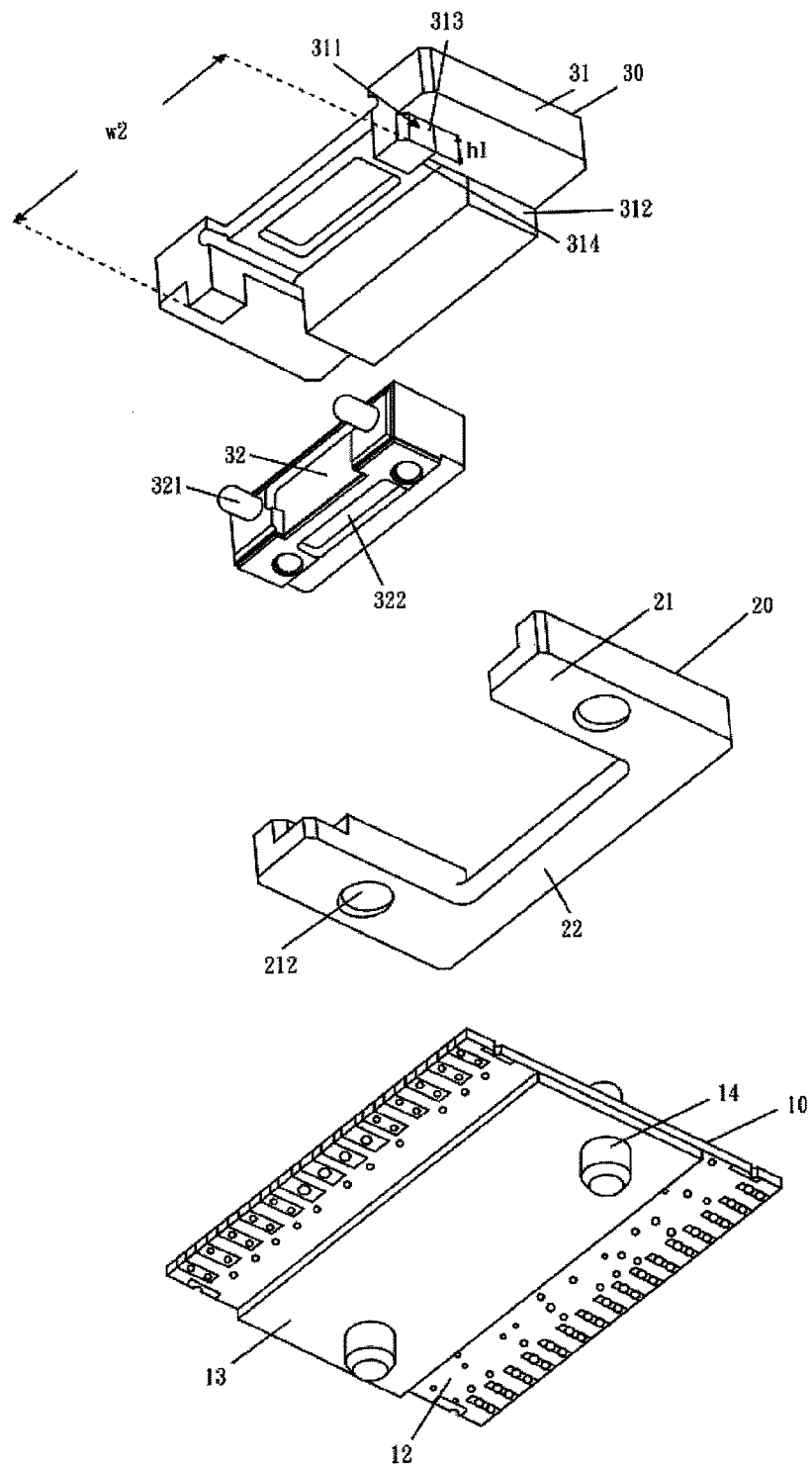
FIG. 2 is an exploded perspective bottom view of the optical transceiver module depicted in FIG. 1.

Please refer to FIG. 1 and FIG. 2 for two exploded perspective views of an optical transceiver module according to the present invention, wherein FIG. 1 is a perspective top view and FIG. 2, a perspective bottom view.

As shown in the figures, the optical transceiver module of the present invention includes a circuit substrate 10, a z-axis positioning base 20 provided on the circuit substrate 10, and a fiber-optic lens element 30 provided on the z-axis positioning base 20.

The circuit substrate 10 can be a flexible circuit board 12 or a printed circuit board. In this embodiment, the circuit substrate 10 is a flexible circuit board 12, and the flexible circuit board 12 is connected with a reinforcing bottom plate 13 to facilitate subsequent connection with the z-axis positioning base 20. However, the reinforcing bottom plate 13 is not an essential element in the present invention and can be dispensed with if the positioning base 20 has no problem connecting with the circuit substrate 10. The circuit substrate 10 is provided with circuits (not shown) to be electrically connected to an external electric device to which the optical transceiver module is applied.

The circuit substrate 10 carries thereon an optical transceiver sub-module 11 for conversion between electrical signals and optical signals. The optical transceiver sub-module 11 includes an optical transmitter sub-module 111 and an optical receiver sub-module 112 for transmitting and receiving optical signals and converting optical signals to and from electrical signals. To carry out conversion between electrical and optical signals, the optical transmitter sub-module 111 can be a laser diode, and the optical receiver sub-module 112 can be a photodiode. The present invention imposes no particular limitations on the number of the optical transmitter sub-module 111 or the number of the optical receiver sub-module 112; the numbers can be set according to the intended use. It is feasible to have only the optical transmitter sub-module 111, only the optical receiver sub-module 112 or both.

The z-axis positioning base 20 is connected to the surface of the circuit substrate 10 that carries the optical transceiver sub-module 11. The z-axis positioning base 20 includes two first sides 21 respectively provided on two lateral sides of the optical transceiver sub-module 11 and a second side 22 connecting the two first sides 21. The z-axis positioning base 20 also has an opening 23 corresponding in position to a side of the optical transceiver sub-module 11 that faces away from the second side 22. Each of the two first sides 21 and the second side 22 is provided with a step difference 211, 221. The space surrounded by the first sides 21 and the second side 22 is large enough to receive at least a portion of the fiber-optic lens element 30.

To fix the z-axis positioning base 20 to the circuit substrate 10, each first side 21 of the z-axis positioning base 20 is provided with a through hole 212, and each through hole 212 is inserted by a fastening post 14 which further extends through the circuit substrate 10 to connect the z-axis positioning base 20 firmly to the circuit substrate 10. The z-axis positioning base 20 also serves to increase dimensional stability of the circuit substrate 10 by reinforcing the circuit substrate 10 and keeping it from warping or being otherwise deformed. With the z-axis positioning base 20 securely connected to the circuit substrate 10 by the fastening posts 14, the connecting force at the connection interface between the positioning base 20 and the circuit substrate 10 is increased.

The fiber-optic lens element 30 is provided on the z-axis positioning base 20 and includes a cover 31 and a fiber-optic lens sub-module 32, wherein the fiber-optic lens sub-module 32 is embedded in a lower surface of the cover 31. The cover 31 includes a recess in which the fiber-optic lens sub-module 32 is embedded. The cover 31 also includes step differences 311, 312 which surround the recess and which correspond in shape and position to the step differences 211 on the two first sides 21 of the z-axis positioning base 20 and the step difference 221 on the second side 22 respectively, such that the cover 31 can be fitted on the z-axis positioning base 20. Each step difference 211 is a recess sunken by a height h1 into an upper surface at the open end of one first side 21 and is defined by a first inner wall 213 extending lengthwise of the first side 21, a second inner wall 214 extending widthwise of the first side 21 and a step surface 215. Each step difference 211 further has a height h2 relative to a bottom surface of the corresponding first side 21. The step difference 221 on the second side 22 faces the opening 23 and has the same height h2 as the step differences 211. Correspondingly, the step differences 311, 312 provided on the lower surface of the cover 31 also have a height h1, first outer walls 313 respectively corresponding to the first inner walls 213 of the step differences 211 and second outer walls 314 respectively corresponding to the second inner walls 214 of the step differences 211. With the step differences 211 of the z-axis positioning base 20 sunken into the upper surfaces of the first sides 21 by the height h1, the fiber-optic lens element 30 can be assembled to and positioned with respect to the z-axis positioning base 20 in a single step. Further, due to the height h2 of the step differences 211, 221 relative to the bottom surfaces of the sides 21, 22, the fiber-optic lens element 30 has a lower surface spaced from the underlying optical transceiver sub-module 11 and is thus prevented from colliding with the optical transceiver sub-module 11. The spacing between the fiber-optic lens element 30 and the optical transceiver sub-module 11 also provides a proper distance so as for the associated lenses to condense light coming from the optical transceiver sub-module 11.

The opposing first inner walls 213 of the two step differences 211 respectively provided on the two first sides 21 are spaced by a distance W1, and the first outer walls 313 of the two step differences 311 provided on the lower surface of the cover 31 are spaced by a distance W2, wherein W1>W2. Thus, when the fiber-optic lens element 30 is fitted on the z-axis positioning base 20, an allowance of W1−W2 exists between the fiber-optic lens element 30 and the z-axis positioning base 20 to allow adjustment in the x-axis direction. Moreover, due to the step differences 211, which have open ends directed out of the pages of FIGS. 1 and 2, the fiber-optic lens element 30 can be fine-tuned on the z-axis positioning base 20 in the y-axis direction, too. Therefore, in addition to enabling one-step positioning of the fiber-optic lens element 30 along the z axis, the z-axis positioning base 20 allows the fiber-optic lens element 30 to be finely adjusted and hence aligned in the x-axis and y-axis directions while being installed on the z-axis positioning base 20.

Figure 3:
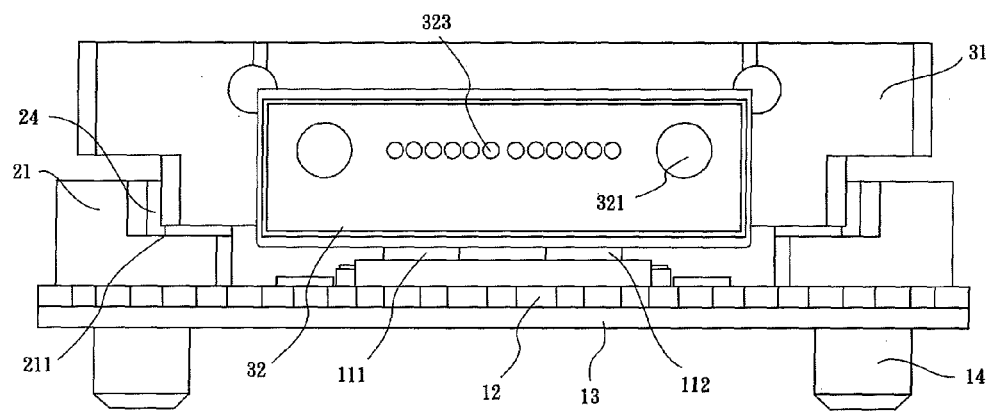
FIG. 3 is a schematic front view of the optical transceiver module depicted in FIG. 1.
Figure 4:
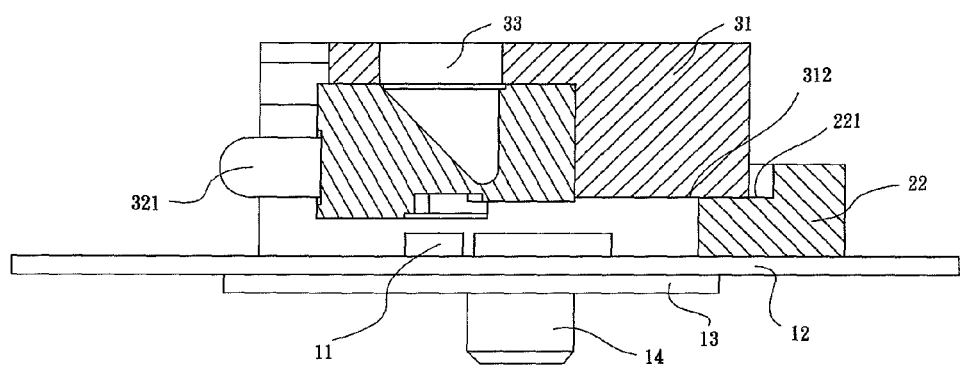
FIG. 4 is a schematic sectional view of the optical transceiver module depicted in FIG. 1.
Figure 5:
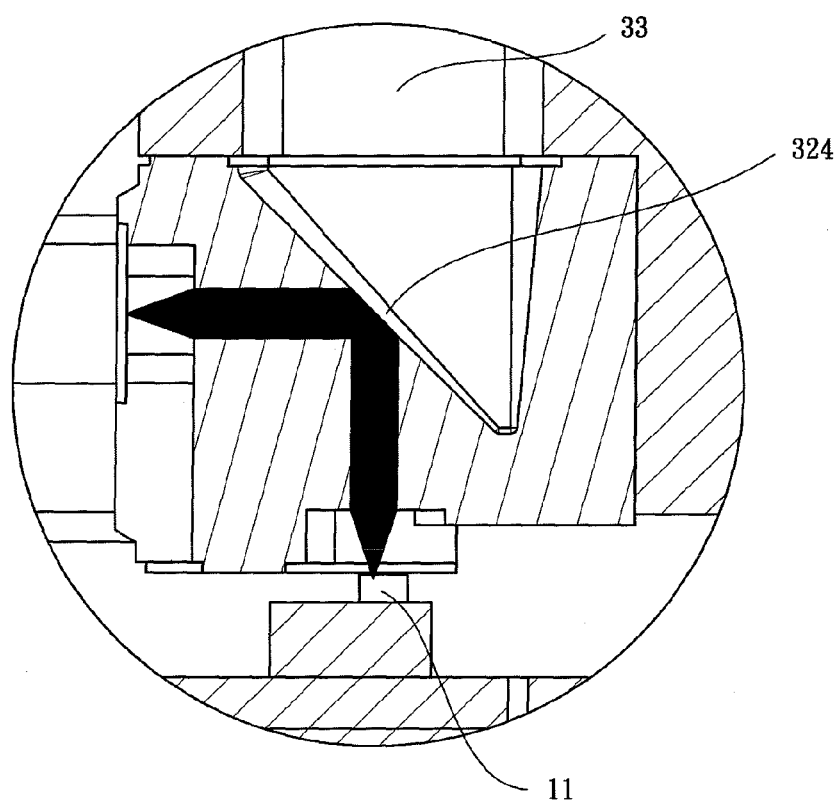
FIG. 5 schematically shows a light wave path according to the present invention.

Reference is now made to FIGS. 3 to 5, wherein FIG. 3 and FIG. 4 are respectively a schematic front view and a schematic sectional side view of the optical transceiver module described above and FIG. 5 is a schematic drawing of a light wave path according to the present invention.

As shown in the drawings, the fiber-optic lens sub-module 32 has a surface perpendicular to its lower surface and provided with an optical fiber connection port 321. The optical fiber connection port 321 is exposed through the opening 23 of the z-axis positioning base 20 so that an optical fiber element can be connected to the optical fiber connection port 321. In order for the outgoing light of the optical transmitter sub-module 111 to enter the optical fiber by total reflection and with the minimum loss or for the light coming from the optical fiber to enter the optical receiver sub-module 112 by total reflection and with the minimum loss, a reflective element 324 is provided in the fiber-optic lens element 30.

Apart from that, the lower surface of the fiber-optic lens sub-module 32 has a plurality of (twelve in this embodiment) condensing lenses 322 corresponding in position to the optical transceiver sub-module 11, and the optical fiber connection port 321 is provided with a plurality of condensing lenses 323 respectively corresponding in position to the condensing lenses 322. The reflective element 324 in the fiber-optic lens element 30 reflects the light-wave signals of the optical fiber connection port 321 at an angle such that the light-wave signals enter the optical receiver sub-module 112, or reflects the light of the optical transmitter sub-module 111 at an angle such that the light enters the optical fiber coupled to the optical fiber connection port 321. In either case, the reflection is carried out inside the fiber-optic lens sub-module 32.

In order for the fiber-optic lens element 30 to precisely align light-wave signals with the optical transceiver sub-module 11 on the circuit substrate 10 in the x-axis and y-axis directions, an adjustment space 24 is provided between the step differences 211, 221 and the step differences 311, 312, thus allowing the fiber-optic lens sub-module 32 to be fine-tuned in the x-axis and y-axis directions. In addition, a window 33 is provided on an upper surface of the cover 31 as well as on an upper surface of the fiber-optic lens sub-module 32. The two windows 33 correspond in position to each other, making it easy to check whether the optical transceiver sub-module 11 is properly aligned during assembly. Once the fiber-optic lens sub-module 32 is aligned with the optical transceiver sub-module 11 and the light-wave signals are output at the maximum power, a bonding material is applied to a groove 222 and to the adjustment space 24 between the step differences 211, 221 of the z-axis positioning base 20 and the step differences 311, 312 of the cover 31, thereby fixing the fiber-optic lens sub-module 32 to the z-axis positioning base 20.

In the present invention, the "x-axis" direction refers to the left-right direction of the optical transceiver module as shown in the drawings, the "y-axis" direction refers to the front-rear direction of the optical transceiver module as shown in the drawings, and the "z-axis" direction is the direction perpendicular to both the x-axis and y-axis directions, i.e., the up-down direction as shown in the drawings.

To sum up, the z-axis positioning base of the present invention enables one-step positioning so that the fiber-optic lens element, once assembled to the z-axis positioning base, has a fixed height in the z-axis direction to facilitate assembly. The z-axis positioning base also allows the fiber-optic lens element and the optical transceiver sub-module on the circuit substrate to be securely connected, and correspond in position, to each other such that modular integration of the fiber-optic lens element and the optical transceiver sub-module is achieved. Moreover, the z-axis positioning base can prevent the lateral forces generated in the xy plane by repeated insertion and removal of an optical fiber connector from defocusing, loosening or even dislodging the optical transceiver sub-module on the flexible circuit board.

While the invention has been described by means of specific embodiments, numerous modifications and variations could be made thereto by those skilled in the art without departing from the scope and spirit of the invention set forth in the claims.

What is claimed is:

1. An optical transceiver module, comprising:
   a circuit substrate carrying thereon an optical transceiver sub-module for converting electrical signals to and from optical signals;
   a z-axis positioning base connected to a surface of the circuit substrate that carries the optical transceiver sub-module, wherein the z-axis positioning base comprises two first sides respectively provided on two lateral sides of the optical transceiver sub-module, a second side provided between and connecting the two first sides, an opening corresponding in position to a side of the optical transceiver sub-module that faces away from the second side, and a step difference provided on each of the two first sides and the second side; and
   a fiber-optic lens element provided on the z-axis positioning base, the fiber-optic lens element comprising a cover and a fiber-optic lens sub-module, wherein the fiber-optic lens sub-module is embedded in a lower surface of the cover;
   wherein the fiber-optic lens sub-module has a lower surface provided with a plurality of condensing lenses corresponding in position to the optical transceiver sub-module and has a surface which is perpendicular to the lower surface provided with the condensing lenses and which has an optical fiber connection port provided with a plurality of condensing lenses, and the fiber-optic lens sub-module is provided therein with a reflective element for, within the fiber-optic lens sub-module, reflecting light-wave signals of the optical fiber connection port into the optical transceiver sub-module or reflecting light-wave signals of the optical transceiver sub-module into the optical fiber connection port, the optical fiber connection port being exposed through the opening of the z-axis positioning base; and
   wherein the cover comprises a recess in which the fiber-optic lens sub-module is embedded and step differences surrounding the recess and respectively corresponding in position to the step differences provided on the two first sides and the second side of the z-axis positioning base, so as for the cover to be fitted on the z-axis positioning base.

2. The optical transceiver module of claim 1, wherein the second side of the z-axis positioning base is provided with a groove in which a bonding material is filled.

3. The optical transceiver module of claim 1, wherein an adjustment space is formed between the step differences of the z-axis positioning base and the step differences of the cover to enable fine-tuning of the fiber-optic lens sub-module in an x-axis direction and a y-axis direction.

4. The optical transceiver module of claim 1, wherein there is a distance between a lower surface of the fiber-optic lens element and the optical transceiver sub-module.

5. The optical transceiver module of claim 1, wherein the optical transceiver sub-module comprises an optical transmitter sub-module and/or an optical receiver sub-module.

6. The optical transceiver module of claim 1, wherein the cover has an upper surface provided with a window, and the fiber-optic lens sub-module has an upper surface provided with another window corresponding in position to the window of the cover to facilitate checking whether the optical transceiver sub-module is aligned during assembly.

7. The optical transceiver module of claim 1, wherein each said first side of the z-axis positioning base is provided with a through hole through which a fastening post is inserted, and the fastening posts are also inserted through the circuit board such that the z-axis positioning base is securely connected to the circuit substrate.

8. The optical transceiver module of claim 1, wherein the circuit substrate is a flexible circuit board or a printed circuit board.

* * * * *